US006827983B2

(12) United States Patent
Petzoldt et al.

(10) Patent No.: US 6,827,983 B2
(45) Date of Patent: Dec. 7, 2004

(54) LOW TEMPERATURE-DRYING WATERBORNE COATINGS

(75) Inventors: Joachim Petzoldt, Monheim (DE); Heino Müller, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 603 days.

(21) Appl. No.: 09/960,034

(22) Filed: Sep. 20, 2001

(65) Prior Publication Data

US 2002/0107336 A1 Aug. 8, 2002

(30) Foreign Application Priority Data

Sep. 25, 2000 (DE) .......................... 100 47 289

(51) Int. Cl.[7] .......................................... C09D 175/04
(52) U.S. Cl. .................. 427/388.3; 428/423.1; 428/425.8; 524/501; 524/542; 525/456
(58) Field of Search ................. 427/388.3; 428/423.1, 428/425.8; 524/501, 542; 525/456

(56) References Cited

U.S. PATENT DOCUMENTS

| 4,325,946 A | | 4/1982 | Bargiotti et al. ............ 424/180 |
| 4,588,761 A | * | 5/1986 | Thoma et al. ................ 524/38 |
| 4,791,168 A | * | 12/1988 | Salatin et al. ............... 524/601 |
| 5,126,393 A | | 6/1992 | Blum et al. ................ 524/538 |
| 5,569,707 A | | 10/1996 | Blum et al. ................ 524/591 |
| 6,139,918 A | | 10/2000 | Irle et al. ................ 427/385.5 |
| 6,472,465 B1 | * | 10/2002 | Hille et al. ................ 524/591 |
| 2001/0014715 A1 | | 8/2001 | Blum et al. ................ 524/591 |

FOREIGN PATENT DOCUMENTS

| CA | 2033530 | 7/1991 |
| DE | 198 58 818 A1 | 6/2000 |

OTHER PUBLICATIONS

J. Coatings Technol. vol. 67, No. 844, May 1995 pp. 57–65, Statistical Study of Hydrolytic Stability in Amine–Neutralized Waterborne Polyester Resins as a Function of Monomer Composition, Travis E. Jones, Julia M. McCarthy.
21st Waterborne, Higher–Solids and Powder Coatings Symposium, Feb. 9–11, 1993, Progress in Development of Waterborne Pur–Primers for the Automotive OEM Industry, Dr. Manfred Bock and Dr. Holger Casselman.

\* cited by examiner

*Primary Examiner*—David J. Buttner
(74) *Attorney, Agent, or Firm*—Joseph C. Gil; Thomas W. Roy

(57) ABSTRACT

The present invention relates to a storage-stable, waterborne, one-component, coating composition, which can be cured at temperatures below 100° C. to provide a stone chip resistant and sandable coating, containing as the binder a polyurethane dispersion A, which after physical drying results in a coating having a pendulum hardness according to DIN 53 157 of >90 s; a polyurethane dispersion B, which after physical drying results in a coating having a pendulum hardness (DIN 53 157) of <90 s; and a melamine resin C, which is preferably highly reactive.

The present invention also relates to a process for coating substrates with these coating compositions and to the resulting substrates.

14 Claims, No Drawings

LOW TEMPERATURE-DRYING WATERBORNE COATINGS

BACKGROUND OF THE INVENTION

1. Field of the Invention

The present invention relates to waterborne one-component binder compositions for the preparation of sandable, stone chip resistant and weather resistant coatings, preferably for automotive OEM finishing, which dry at temperatures below 100° C., and to the preparation and use thereof.

2. Description of the Prior Art

In automotive OEM finishing, a multi-layer composition of the top coats has become generally established and is also being obtained to an increasing extent with the use of waterborne coating compositions. These coatings also have to meet economic requirements. The objective is to apply the coatings in as few and as inexpensive individual steps as possible.

In the conventional coating compositions for automotive OEM finishing, a stone chip resistant layer and a primer surfacer layer or a combination of the two (stone chip resistant primer surfacer) is applied initially to a metal surface primed by cathodic electro-dipcoating. A base coat followed by a clear coat or alternatively a pigmented top coat is then applied to these layers.

The stone chip resistant and/or primer surfacer layer serves to smooth out surface irregularities and brings about good stone chip resistance due to high elasticity and deformability. Flexible polyester or polyether polyurethanes and polyisocyanate or melamine crosslinking agents have previously been used for this layer. Before the application of base coat and clear coat or top coat, the stone chip resistant primer surfacer is stoved. This is necessary for improving the condition of the top coat and for partially sanding the primer surfacer layer before application of the upper coating layers. After the clear coat or top coat has been applied, stoving is carried out once again. A disadvantage of this process is that two expensive stoving processes at temperatures of >120° C. are required. Coatings drying at lower temperatures, of the kind that may be formulated, for example, from polyacrylates, do not exhibit the required stone chip resistance since they crosslink to form brittle films.

There is a need for storage-stable, one-component coating compositions which, apart from good stone chip resistance, have good sandability and surface hardness. The coating should also be lightfast in order to produce a weather resistant coating even in the case of moderately hiding top or base coats or in areas where a pigmented top or base coat is dispensed with entirely. The coating should also adhere to different substrates, such as the plastics frequently used in automobile construction (pretreated polypropylene or polyethylene, pretreated polypropylene/EPDM blends, polyurethane-RIM, ABS, polybutylene terephthalate, polycarbonate, polyamide, SMC, BMC and others, and blends of the plastics mentioned), and also ferrous and non-ferrous metals and cured coating layers with chemically different binders. Finally, in view of the low heat resistance of the thermoplastics frequently used in automobile construction (see above), the coating composition should be curable or crosslinked at temperatures below 100° C.

A proposed solution for stone chip resistant coatings and/or primer surfacer layers based on waterborne binders is described, e.g., in EP-A 0 330 139. It is claimed that a polyacrylate may be added to an OH- and COOH-functional polyester. No corresponding embodiments are provided, however. Graft copolymerization of the polyacrylate onto a polyester as the main chain is not described either. The claimed dispersions of acid-functional polyesters are well known to have poor storage stability since they are subject to rapid chemical degradation due to cleavage of ester bonds (e.g. Jones, T. E.; McCarthy, J. M., J. Coatings Technol. 76 (844), p. 57 (1995)).

EP-A 0 024 727, for example, describes a stoving coating composition based on a combination of epoxy resin-phosphoric acid ester, a water-thinnable polyester and water-soluble melamine resins. DE-A 4 000 748 describes, in embodiments, waterborne automotive primer surfacers based on water-thinnable hydroxy-functional polyester-polyurethane resins, optionally other binders and water-soluble amino resins.

The stringent requirements which the automotive industry in particular places on primer surfacer coatings are not yet fully met by these coatings. An improvement was obtained by more refined, polyisocyanate-crosslinked primer surfacer coatings (M. Bock, H. Casselmann, H. Blum "Progress in Development of Waterborne PUR Primers for the Automotive Industry", Proc. Waterborne, Higher Solids and Powder Coatings Symp. New Orleans 1994). All the systems mentioned, however, have the disadvantage that the water-thinnable polyester or polyester-polyurethane resins used have limited storage stability if they are crosslinked with reactive amino- and/or polyisocyanate resins for lower stoving temperatures.

EP-A 0 980 880 describes stone chip resistant, physically drying coatings produced using polyacrylate dispersions in combination with polyurethane dispersions. Said coatings have insufficient sandability, however.

WO PCT/00/01205 describes chip resistant, physically drying coatings produced using polyacrylate dispersions. These combinations, however, exhibit shortcomings in the stone chip resistance at temperatures below 0° C.

An object of the present invention was, therefore, to provide storage-stable, waterborne, one-component, light-fast coating systems having a low co-solvent content which have improved sandability and good stone chip resistance at stoving temperatures of <100° C. It is also an object of the present invention for the coating composition to provide adhesion to the various substrates used in automobile construction.

Surprisingly, it was found that these objects may be achieved by the use of a combination of special hard and highly elastic waterborne polyurethane (PU) dispersions containing virtually no free OH groups, and highly reactive water-thinnable melamine resins.

SUMMARY OF THE INVENTION

The present invention relates to a storage-stable, waterborne, one-component, coating composition, which can be cured at temperatures below 100° C. to provide a stone chip resistant and sandable coating, containing as the binder a polyurethane dispersion A, which after physical drying results in a coating having a pendulum hardness according to DIN 53 157 of >90 s; a polyurethane dispersion B, which after physical drying results in a coating having a pendulum hardness (DIN 53 157) of <90 s; and a melamine resin C, which is preferably highly reactive.

The present invention also relates to a process for coating substrates with these coating compositions and to the resulting substrates.

DETAILED DESCRIPTION OF THE PRIOR ART

Rigid and flexible dispersions can be differentiated by the pendulum hardness of the films obtained by physical drying. The rigid PU dispersion A is characterized by a König pendulum hardness (according to DIN 53157) of >90 s, whereas the flexible PU dispersion B is characterized by a pendulum hardness of <90 s.

The coating compositions according to the invention may also contain known pigments and additives for automobile fillers. Dispersion A is present in the binder in an amount of 20 to 90% by weight, preferably 40 to 70% by weight; dispersion B is present in an amount of 10–80% by weight, preferably 30–60% by weight; and component C is present in a positive amount of up to 30% by weight, preferably 5 to 20% by weight. The percentages of the three resin components add up to 100%, based on the resin solids of the components A, B and C.

Polyurethane dispersions according to WO 00/50482 (believed to correspond to U.S. Ser. No. 09/914,169, herein incorporated by reference) and EP-A 0 330 139 (believed to correspond to U.S. Pat. No. 4,968,536, herein incorporated by reference) are particularly suitable for use as the highly elastic component of such combinations and polyurethane dispersions according to EP-A 0 269 972 (believed to correspond to U.S. Pat. No. 4,764,553, herein incorporated by reference) are suitable for use as the rigid component. The cited patent literature describes the production of the polyurethane dispersions by the so-called acetone process. Dispersions having a similar composition, which are produced by the so-called melt dispersion process, are also suitable for use. Preferably the dispersions are neutralized with tertiary amines, such as triethylamine, diisopropylethylamine and morpholine. Optionally these binders are combined with water-dilutable amino resins, preferably melamine resins, having a reactivity adapted to the stoving temperature (e.g. Cymel 327, 328-Cytec Industries B.V., Rotterdam, the Netherlands, Maprenal VMF 3921 W -Vianova Resins GmbH und Co. KG, Frankfurt, Germany).

The invention is further illustrated but is not intended to be limited by the following examples in which all parts and percentages are by weight unless otherwise specified.

EXAMPLES

Example 1

A water-thinnable, OH group-containing, fatty acid-modified polyester-polyurethane dispersion (Bayhydrol FT 145, Bayer AG, Leverkusen, Germany) in combination with a reactive melamine resin (Cymel 328, Cytec Industries B. V., Rotterdam, Netherlands). 35.8 g of a pigment paste described below were stirred with 50.8 g of a 45% fatty acid-modified polyester-polyurethane dispersion (Bayhydrol FT 145) and 3.0 g of an 85% commercial waterborne melamine resin (Cymel 328) and diluted with 10.4 g of distilled water to a spray viscosity of about 17 s ISO cup 5 mm.

Example 2

A water-thinnable, hard polyurethane dispersion with a low OH group content (Bayhydrol PR 135, Bayer AG, Leverkusen, Germany) in combination with an elastic polyurethane dispersion according to EP-A 0 330 139 (believed to correspond to U.S. Pat. No. 4,968,536, herein incorporated by reference).

The elastic polyurethane dispersion was based prepared by weighing out 272 g of an aliphatic polycarbonate diol (Desmophen 2020, Bayer AG, Leverkusen, Germany, molecular weight 2000), 272 g of a polyester diol based on adipic acid, hexane diol, neopentyl glycol (molecular weight 1700) and 26.8 g of dimethylol propionic acid under a nitrogen atmosphere and heating 65° C. 11.3 g of trimethylolpropane, 250 g of acetone, 106.6 g of isophorone diisocyanate, 75.9 g of hexamethylene diisocyanate and 0.025% of dibutyltin dilaurate were then added and heated at reflux temperature until the theoretical NCO value, or a value slightly below this, was reached. After cooling to 45° C., 17.2 g of triethylamine (degree of neutralization 85%) and 1150 g of distilled water were added and the mixture was stirred at 40° C. to 50° C. until no more free NCO groups could be detected. The acetone was then removed by distillation. The resulting very fine-particle elastic polyurethane dispersion had a solids content of about 40%, a pH of about 7.7 and a viscosity of about 7800 mPa.s/23° C. 34.5 g of the pigment paste used in Example 1 were mixed by means of a stirrer with 34.9 g of a 35% polyurethane dispersion (Bayhydrol PR 135) and 30.6 g of the 40% elastic polyurethane dispersion according to EP-A 0 330 139 described above.

Example 3

A water-thinnable hard polyurethane dispersion with a low OH group content (Bayhydrol PR 135) in combination with a reactive melamine resin (Cymel 328). 34.4 g of the pigment paste used in Example 1 were stirred with 62.7 g of a 35% polyurethane dispersion (Bayhydrol PR 135) and 2.9 g of an 85% commercial waterborne melamine resin (Cymel 328).

Example 4

A water-thinnable elastic polyurethane dispersion with a low OH group content according to EP-A 0 330 139 in combination with a reactive melamine resin (Cymel® 328).

37.3 g of the pigment paste used in Example 1 were stirred with 59.5 g of the 40% polyurethane dispersion according to EP-A 0 330 139 (see Example 2 above) and 3.1 g of an 85% commercial waterborne melamine resin (Cymel 328).

Example 5

A water-thinnable hard dispersion with a low OH group content (Bayhydrol PR 135) and an elastic polyurethane dispersion according to EP-A 0 330 139 in a ratio of 1:1 in combination with a reactive melamine resin (Cymel 328).

35.8 g of the pigment paste used in Example 1 were intimately mixed with 32.6 g of a 35% polyurethane dispersion (Bayhydrol PR 135), 28.6 g of a 40% elastic polyurethane dispersion according to EP-A 0 330 139 (see Example 2 above) and 3.0 g of an 85% commercial waterborne melamine resin (Cymel 328) using a stirrer.

Pigment paste for coating:

Examples 1–5

A predispersed slurry containing 10.8 g of a 70% water-thinnable polyester resin (Bayhydrol D 270), 21.1 g of distilled water, 1.5 g of 10% dimethylethanolamine in water and 2.8 g of commercial wetting agent, 27.7 g of titanium dioxide (Tronox R-FD-I, Kerr McGee Pigments GmbH and Co. KG, Krefeld, Germany) 0.3 g of black iron oxide (Bayferrox 303 T Bayer AG, Leverkusen, Germany), 27.9 g of barium sulfate (Blanc fixe Micro, Sachtleben Chemie GmbH, Duisburg, Germany), 6.8 g of talc (Micro Talc IT Extra, Norwegian Talc, Frankfurt, Germany) and 1.0 g of anti-settling agent (Aerosil R 972), Degussa-Hüls AG, Frankfurt, Germany) were ground to a paste for 30 minutes in a commercial bead mill, with cooling.

This resulted in coating compositions with a binder-pigment/filler ratio of about 1:1) and binder compositions below, solids contents in parts by weight (parts by wt.) and flow times in the ISO 5 mm cup immediately and after storage for 7 d at 40° C.

| Coating example | 1 | 2 | 3 | 4 | 5 |
|---|---|---|---|---|---|
| Binder-solid resins (parts by wt.) | | | | | |
| OH polyester | 90.0 | — | — | — | — |
| PUD, hard, low-OH content | — | 50.0 | 90.0 | — | 45.0 |
| PUD, elast. low-OH content | — | 50.0 | — | 90.0 | 45.0 |
| Melamine | 10.0 | — | 10.0 | 10.0 | 10.0 |
|  | 100.0 | 100.0 | 100.0 | 100.0 | 100.0 |
| Solids content | 50.9% | 49.1% | 48.9% | 53.1% | 50.9% |
| Flow time ISO 5 mm | 17 s | 12 s | 15 s | 13 s | 12 s |
| Flow time after 7 d 40° C. | 24 s | 12 s | 13 s | 13 s | 12 s |

These coatings were applied to the substrates below in a dry film thickness of 25–35 μm using flow cup spray guns with a nozzle diameter of 1.5 mm and an atomizing pressure of 5 bar. The wet coating films were flashed off for 5 minutes at 23° C. and then stoved in a circulating air oven. The substrates were glass sheets for the pendulum hardness and gloss tests, degreased steel sheets for the adhesion/cross-cut, Erichsen indentation and sandability tests, and steel sheets coated with a cathodic electro-dipcoat, which are used in automobile production, for the stone chip tests.

The following test results were obtained:

| Coating example | 1 | 2 | 3 | 4 | 5 |
|---|---|---|---|---|---|
| Stoving conditions, primer surfacer: 10 min RT and 30 min 90° C. | | | | | |
| Pendulum hardness | 21 s | 54 s | 108 s | 30 s | 65 s |
| Gloss 60° | 93% | 51% | 51% | 56% | 53% |
| Erichsen indentation | 10 mm | 10 mm | 10 mm | 10 mm | 10 mm |
| Cross-cut test (0–5) | 0 | 1 | 0 | 0 | 0 |
| Sandability, wet (1–4) | 3 | 2–3 | 1 | 2–3 | 1–2 |

Stone Chip Tests

Composition: cathodic electro-dipcoated metal sheet, primer surfacer (10 min RT and 30 min 90° C.), waterborne base coat "black metallic" (15 μm, 10 min 80° C.), 2-component acrylic clear coat (40 μm, 30 min, 90° C.) A) VDA[German Automotive Industry Association] test firing: 2 times 500g; 1.5 bar

| Coating example | 1 | 2 | 3 | 4 | 5 |
|---|---|---|---|---|---|
| Intermediate adhesion cath.electro-dipcoat/ primer surfacer (1–3) | 2 | 2–3 | 2 | 1 | 1 |
| Intermediate adhesion primer surfacer/ top coat (1–3) | 1 | 1 | 1 | 1 | 1 |
| Stone chip result (1–10) | 1 | 2 | 2–3 | 1 | 1 |
| B) BMW wedge at RT and −30° C. | | | | | |
| Chipping of metal sheet RT /−30° C. | 0/1 mm | 0/0 | 0/2 mm | 0/0 | 0/0 |

Pendulum hardness: König oscillation test DIN 53 157
Gloss measurement 60° to DIN EN ISO 2813
Erichsen indentation to DIN EN ISO 1520
Cross-cut to DIN EN ISO 2409
Sandability in accordance with the VW specification, wet by hand with sandpaper with standardized grain size 320–400, index 1–4 (1=complete removal of sanding dust from the sandpaper by a water jet; 4=not sandable)
VDA stone chip test in accordance with the VW specification with 2×500 g steel shot fired at an air pressure of 1.5 bar. Index 1–10 (1=no penetration, 10=very large and numerous chips off the sheet)
Intermediate adhesion. Index 1–3 (1=good, 3=no adhesion)
Stone chip test in accordance with BMW specification with an ESP 10 single-impact testing device from Byk at 3 bar test pressure. Determination of the plane of separation in mm from the steel sheet.

The results show that sufficient storage stability is not guaranteed in Example 1 due to the presence of an OH-group-containing polyester dispersion and a highly reactive melamine resin. In Examples 3–5 the stability using a melamine resin is more favorable if polyurethane dispersions having a low content of OH groups are used. The required hardness of the coating can be adjusted by the proportion of rigid and flexible dispersions having low contents of OH groups in the formulation. Example 5 displayed good results with regard to stability, polishability and impact strength. Without the melamine resin these mixtures are also stable and usable.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A storage-stable, waterborne, one-component, coating composition, which can be cured at temperatures below 100° C. to provide a stone chip resistant and sandable coating, comprising as the binder a polyurethane dispersion A, which after physical drying results in a coating having a pendulum hardness according to DIN 53 157 of >90 s; a polyurethane dispersion B, which after physical drying results in a coating having a pendulum hardness (DIN 53 157) of <90 s; and a melamine resin C.

2. The coating composition of claim 1 wherein polyurethane dispersions A and B have a hydroxyl group content of 0 to 1.0 wt. %, based on resin solids.

3. The coating composition of claim 1 wherein polyurethane dispersions A and B have a hydroxyl group content of 0–0.5 wt. %, based on resin solids.

4. The coating composition of claim 1 wherein the binder comprises
   i) 20 to 90 wt. % of polyurethane dispersion A,
   ii) 10 to 80 wt. % of polyurethane dispersion B and iii) a positive amount of up to 30 wt. % of melamine resin C, wherein the percentages of A, B and C are based on resin solids and add up to 100% by weight, based on the resins solids of A, B and C.

5. The coating composition of claim 2 wherein the binder comprises i) 20 to 90 wt. % of polyurethane dispersion A, ii) 10 to 80 wt. % of polyurethane dispersion B and iii) a positive amount of up to 30 wt. % of melamine resin C, wherein the percentages of A, B and C are based on resin solids and add up to 100% by weight, based on the resins solids of A, B and C.

6. The coating composition of claim 3 wherein the binder comprises i) 20 to 90 wt. % of polyurethane dispersion A, ii) 10 to 80 wt. % of polyurethane dispersion B and iii) a positive amount of up to 30 wt. % of melamine resin C, wherein the percentages of A, B and C are based on resin solids and add up to 100% by weight, based on the resins solids of A, B and C.

7. The coating composition of claim 1 wherein the binder comprises i) 40 to 70 wt. % of polyurethane dispersion A, ii) 30 to 60 wt. % of polyurethane dispersion B and iii) 5 to 30 wt. % of melamine resin C, wherein the percentages of A, B and C are based on resin solids and add up to 100% by weight, based on the resins solids of A, B and C.

8. The coating composition of claim 2 wherein the binder comprises i) 40 to 70 wt. % of polyurethane dispersion A, ii) 30 to 60 wt. % of polyurethane dispersion B and iii) 5 to 30 wt. % of melamine resin C, wherein the percentages of A, B and C are based on resin solids and add up to 100% by weight, based on the resins solids of A, B and C.

9. The coating composition of claim 3 wherein the binder comprises i) 40 to 70 wt. % of polyurethane dispersion A, ii) 30 to 60 wt. % of polyurethane dispersion B and iii) 5 to 30 wt. % of melamine resin C, wherein the percentages of A, B and C are based on resin solids and add up to 100% by weight, based on the resins solids of A, B and C.

10. A sandable and stone chip resistant coated substrate prepared from a storage-stable, waterborne, one-component, coating composition, which can be cured at temperatures below 100° C. to provide a stone chip resistant and sandable coating, comprising as the binder a polyurethane dispersion A, which after physical drying results in a coating having a pendulum hardness according to DIN 53 157 of >90 s, a polyurethane dispersion B, which after physical drying results in a coating having a pendulum hardness (DIN 53 157) of <90 s, and a highly reactive melamine resin C.

11. A process for preparing a coated substrate which comprises coating a substrate with a storage-stable, waterborne, one-component, coating composition, which can be cured at temperatures below 100° C. to provide a stone chip resistant and sandable coating, comprising as the binder a polyurethane dispersion A, which after physical drying results in a coating having a pendulum hardness according to DIN 53 157 of >90 s, a polyurethane dispersion B, which after physical drying results in a coating having a pendulum hardness (DIN 53 157) of <90 s, and a highly reactive melamine resin C.

12. The process of claim 11 wherein the substrate is pretreated prior to the coating step.

13. The process of claim 11 wherein the coating is cured at a temperature of ≦100° C.

14. The process of claim 11 wherein the coating is cured at a temperature of 60° C. to 100° C. for 20 to 40 minutes.

* * * * *